Figure 1:
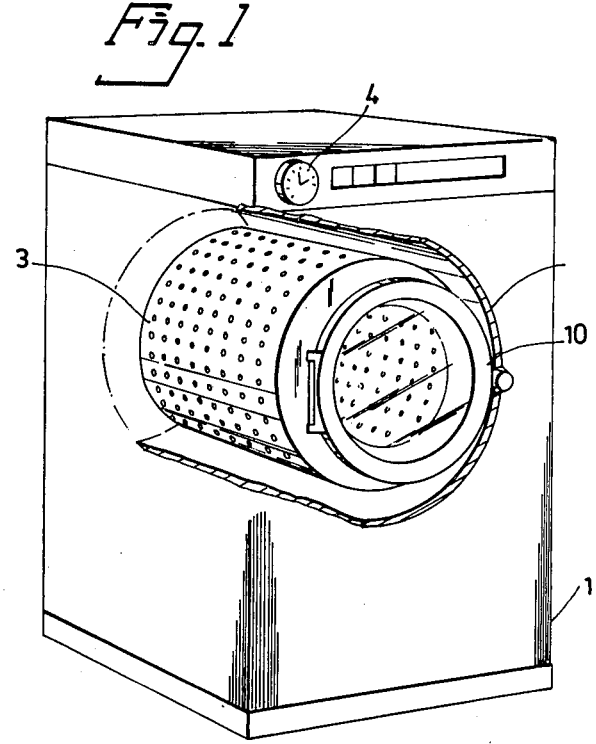

United States Patent [19]

Hartwig

[11] 4,446,706
[45] May 8, 1984

[54] WASHING MACHINE

[75] Inventor: Carl S. M. Hartwig, Täby, Sweden

[73] Assignee: Institut Cerac S.A., Ecublins, Switzerland

[21] Appl. No.: 449,937

[22] Filed: Dec. 15, 1982

[30] Foreign Application Priority Data

Dec. 18, 1981 [CH] Switzerland ............... 8097/81
Jun. 29, 1982 [CH] Switzerland ............... 3971/82

[51] Int. Cl.³ .............. D06F 23/02; D06F 37/38; H02P 5/34
[52] U.S. Cl. .............................. 68/24; 68/140; 318/801; 318/807
[58] Field of Search ............... 68/12 R, 24, 140; 318/807, 808, 801

[56] References Cited

U.S. PATENT DOCUMENTS

| | | | |
|---|---|---|---|
| 3,467,904 | 9/1969 | Studtmann et al. | 318/807 |
| 3,474,320 | 10/1969 | Chandler | 318/808 X |
| 3,604,222 | 9/1971 | Sandkrug et al. | 68/24 |
| 3,619,749 | 11/1971 | Schieman | 318/798 |
| 3,619,750 | 11/1971 | Mokrytzki | 318/798 |
| 3,662,247 | 5/1972 | Schieman | 318/808 X |
| 3,700,989 | 10/1972 | Jensen | 318/798 |
| 3,840,764 | 10/1974 | Burger | 68/24 X |
| 4,158,163 | 6/1979 | Eriksen et al. | 318/798 |
| 4,255,695 | 10/1981 | Plunkett | 318/807 X |
| 4,327,315 | 4/1982 | Kawada et al. | 318/811 |

FOREIGN PATENT DOCUMENTS

| | | | |
|---|---|---|---|
| 53-16822 | 2/1978 | Japan | 318/808 |
| 714610 | 2/1980 | U.S.S.R. | 318/808 |

Primary Examiner—Philip R. Coe
Assistant Examiner—Frankie L. Stinson
Attorney, Agent, or Firm—Sughrue, Mion, Zinn, Macpeak, and Seas

[57] ABSTRACT

The invention relates to a washing machine which comprises a casing (1) having a washing-liquid container (2) and a cylindrical washing drum (3) rotatably arranged in the container. The washing drum is driven by a single, brushless a.c.motor, to which energy is supplied from an inverter (41), so that the washing machine may be driven at a desired, alternative number of revolutions/min, which are preprogrammed and within an extended range of revolutions/min.

8 Claims, 16 Drawing Figures

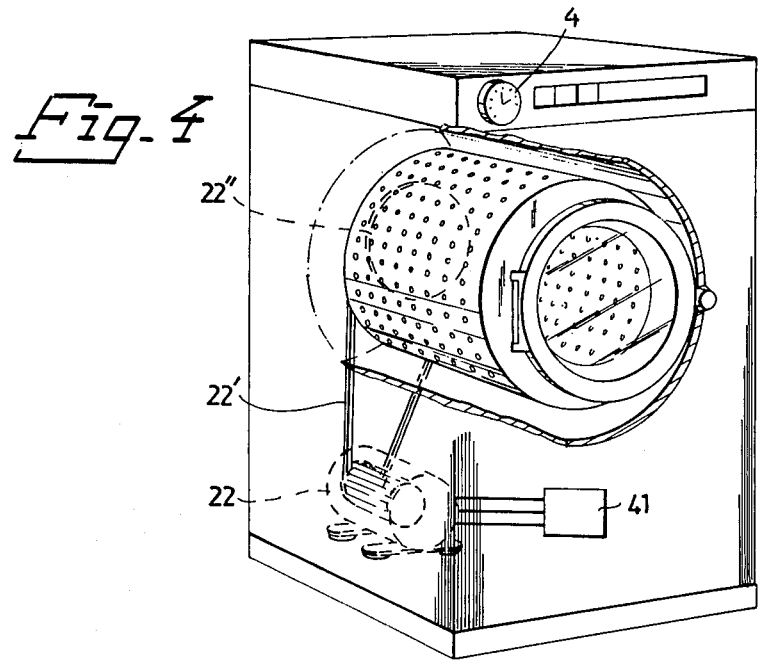
Fig. 4
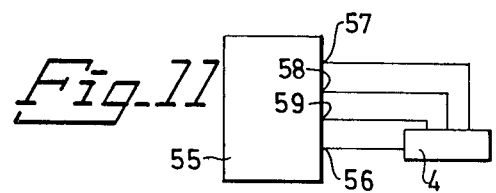
Fig. 11
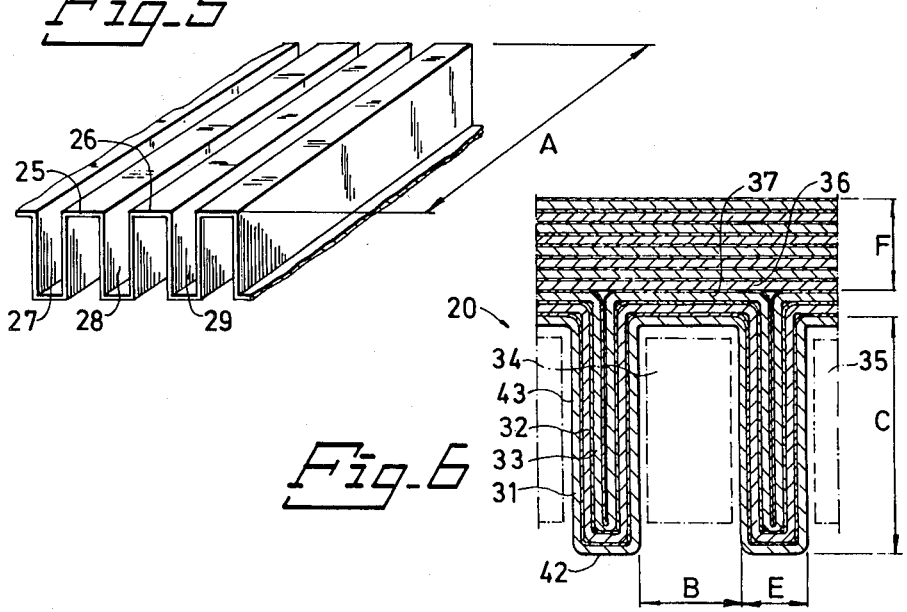
Fig. 5
Fig. 6

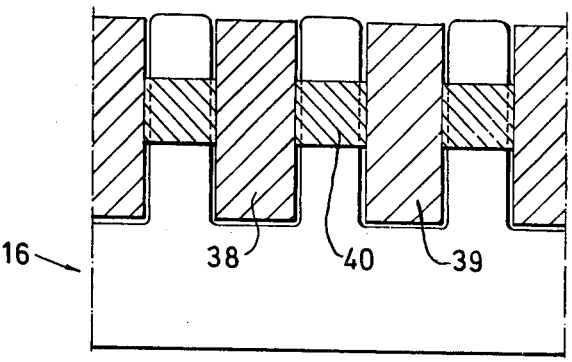
Fig_7
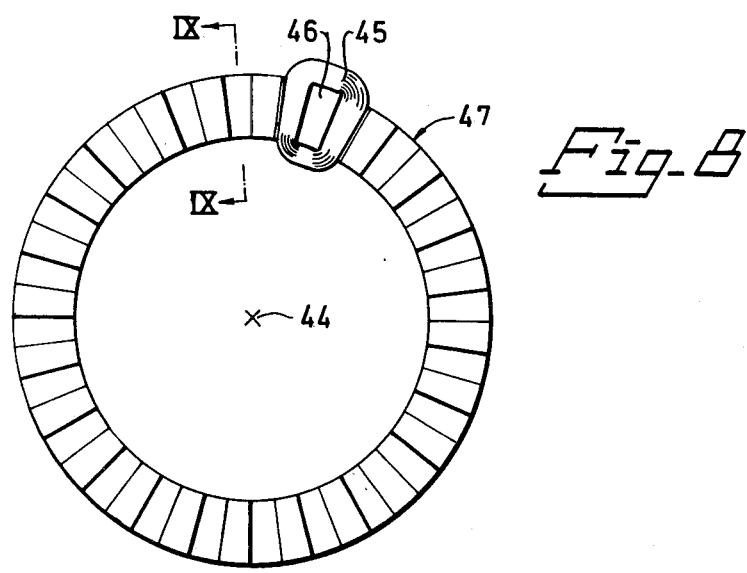
Fig_8
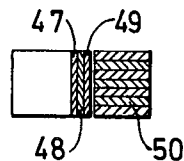
Fig_9
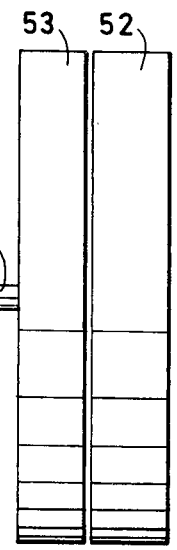
Fig_10

WASHING MACHINE

The present invention relates to a washing machine which comprises a casing having a washing-liquid container and a motordriven cylindrical washing drum arranged for rotation in said container and intended to accommodate the load to be washed.

In known washing machines there is provided at least one motor for rotating the washing drum at a first speed during a load-washing sequence, and a second speed during spin-drying of the washed load. In order to wash the load effectively, it is necessary to rotate the drum at a relatively low speed, for example a speed of 50 r.p.m. in the case of a drum diameter of about 50 cm, while in order to effectively spin-dry the washed load it is necessary to rotate the drum at a much higher speed for example a speed of 1200 r.p.m. Unless complicated and expensive transmission means are provided, it is practically impossible to rotate the drum within such a wide range of speed while using one single motor, and hence if a single motor is used it is necessary to compromise, which normally means that the speed at which the drum is rotated during a spin-drying sequence is much too low to dry the load satisfactorily. A better result is obtained when separate motors are used for respective washing and spin-drying cycles, the washing cycle being carried out at a first drum speed, determined by the one motor, and the spin-drying cycle being carried out at a second drum speed, determined by the other motor. Apart from the fact that the washing machine is made more expensive by the provision of two motors, the possibilities of varying the speeds determined by the two motors are very small. For example, when the load to be washed comprises a specific material which requires the washing drum to be rotated at a speed different to that required for the washing of normal everyday materials, it is not possible with the use of a.c. motors to regulate the drum speed in the manner desired. Consequently, a prime object of the invention is to provide a washing machine of the kind described in the introduction provided with a drive system enabling the washing drum to be driven at a desired alternative number of revolutions/minute, which are preprogrammed and within an extended range of revolutions/minute.

This object is realized by arranging for the washing drum to be driven by a single, brushless a.c. motor to which an operational voltage is supplied from an inverter.

According to a further embodiment of the invention, the a.c. motor comprises firstly a stator, provided with non-pole-switchable windings which are constantly active in operation, and secondly a rotor co-acting with the stator to cause the washing drum to rotate about its cylinder axis, the inverter comprising a voltage supply means arranged to supply alternating voltage to the windings at a frequency, amplitude and phase sequence so adjusted that the motor alone ensures satisfactory washing of the load in both directions of rotation of the motor and spin-drying of the load each at at least one selected speed.

A further object of the invention is to provide a washing machine which lacks transmission means between motor and washing drum, this object being realized by connecting the rotor of the inverter-driven brushless a.c. motor directly to the washing drum.

Other characterizing features of the invention are set forth in the accompanying claims.

The invention will now be described in more detail with reference to the accompanying drawings, in which FIG. 1 is a partly cut-away view of a preferred type of washing machine, illustrating parts essential to the invention.

Figure 2:
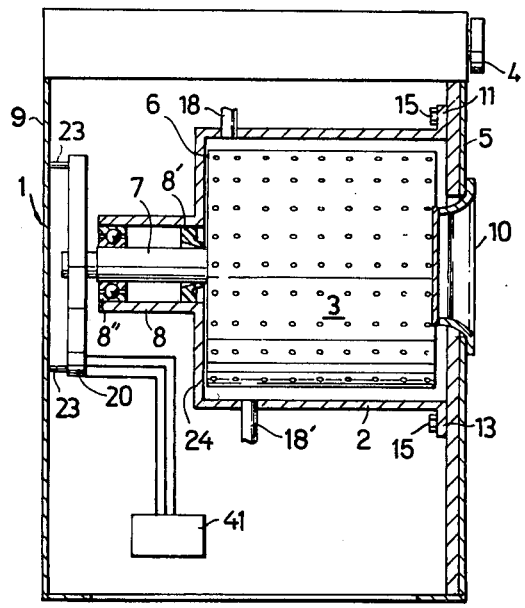
Figure 3:
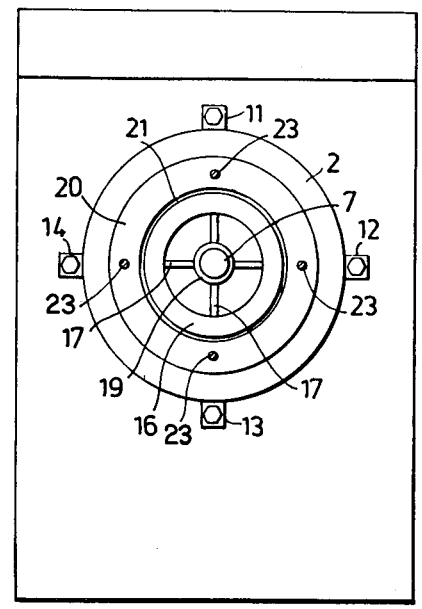
Figure 12:
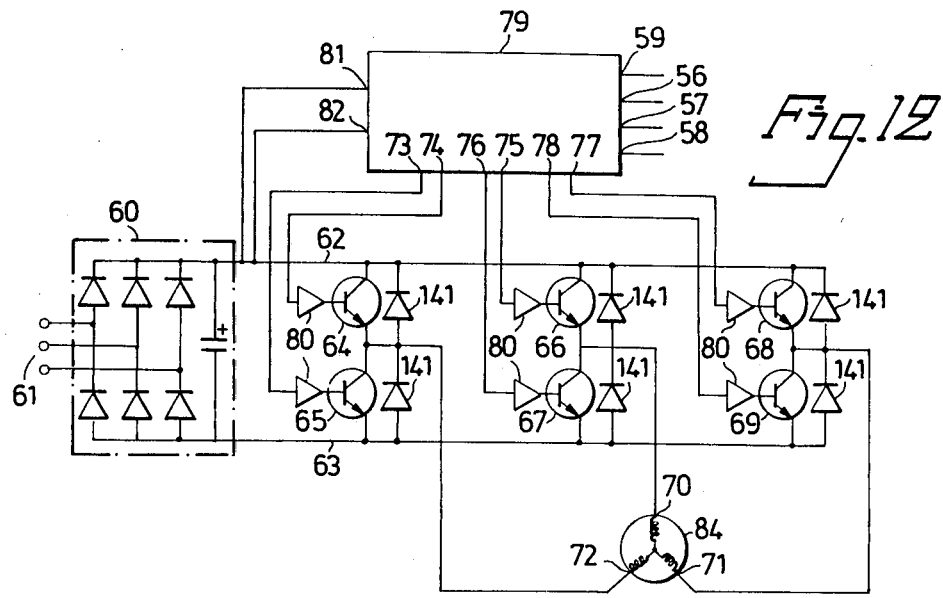
Figure 14:
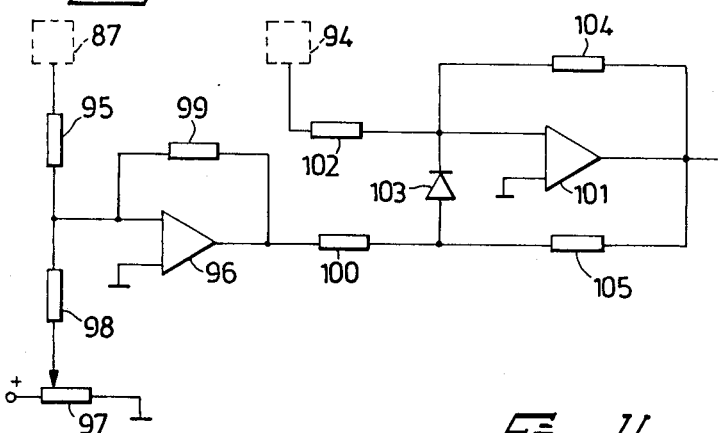
Figure 15:
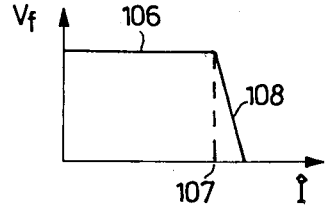
Figure 16:
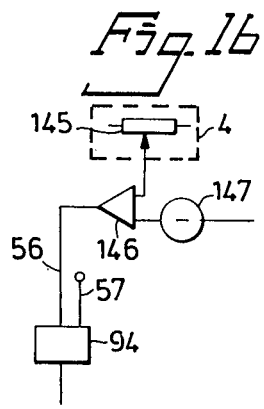
Figure 13:
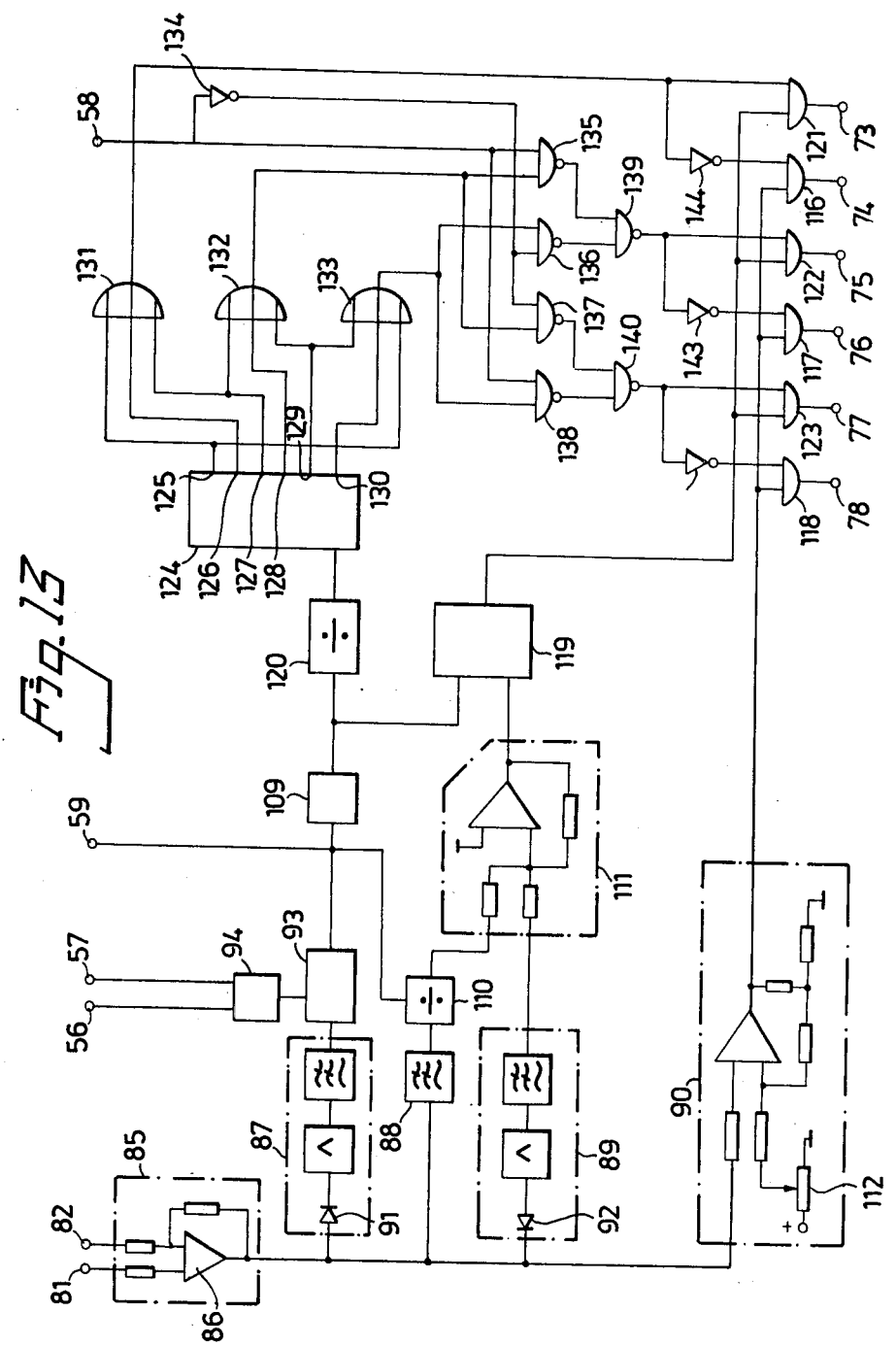

FIG. 2 is an axial, vertical sectional view to the washing-liquid container and the washing drum illustrated in FIG. 1, and shows a drive means according to the invention, FIG. 3 illustrates the washing-liquid container and the drive means of FIG. 2, seen in axial direction, FIG. 4 illustrates a modified type of drive means incorporated in a washing machine according to FIG. 1, FIG. 5 illustrates a length of bent or folded sheet-metal strip for producing the stator core and/or the rotor core of the motor of the drive means according to FIGS. 2 and 3, FIG. 6 illustrates a part of the stator shown in FIG. 3, FIG. 7 illustrates a part of the rotor shown in FIG. 3, FIG. 8 illustrates schematically a modified stator, FIG. 9 is a sectional view taken on the line IX—IX in FIG. 8, FIG. 10 is a simplified view of a stator according to FIG. 8 with a co-acting rotor, FIG. 11 illustrates schematically the electrical coupling of the washing machine, FIG. 12 illustrates the motor drive system, FIG. 13 illustrates the guide means in FIG. 11, FIG. 14 illustrates a control circuit according to FIG. 12, FIG. 15 illustrates the function of the control circuit, shown in FIG. 13, and FIG. 16 illustrates a feed-back circuit for the inverter.

FIGS. 1–3 are very simplified views of a preferred type of washing machine selected for the purpose of illustrating the invention. The washing machine is provided with an outer casing 1 comprising a supporting frame structure (not shown). Arranged within the casing is a liquid-tight washing-liquid container or tank 2. The illustrated washing-liquid container is partly cut away to show a cylindrical drum 3 arranged in the container and comprising a perforated outer metal shell. The washing-liquid container 2 is provided with washing-liquid inlet 18 and outlet 18'.

The drive motor is controlled by a program unit 4 located on the front 5 of the casing. As will best be seen from FIG. 2, the front 5 of the illustrated embodiment is provided on its circular end wall 6 with a trunnion 7, said trunnion being rotatably journalled in a bearing 8 in the form of a hollow cylinder surrounding trunnion 7 of the container 2. The drum 3 is provided with an openable front door 10. Thus, the load to be washed can be placed in the drum 3 through the front door 10, which seals against wall 5. In the illustrated embodiment, the washing-liquid container is carried on supports 11,12,13,14 secured to the wall 5 by bolts 15. The bearing 8 is provided with sealing means 8' and ball bearings 8". As will be seen from FIG. 3, a rotor 16 is non-rotatably mounted on the trunnion 7 projecting from the bearing 8. The rotor 16 has the form of a relatively thin ring provided with spokes, such as spokes 17.

The spokes extend from a hub 19 which is, for example, keyed to the trunnion 7. The rotor 16 is encircled by an annular stator 20. A narrow air gap 21 is located between the inner, cylindrical surface of the stator 20 and the outer, cylindrical surface of the rotor 16. In the illustrated embodiment, the stator 20 has the same thickness as the rotor 16, and is fixedly mounted on one end wall 9 of the casing 1 by means of supports 23.

Although the motor comprising the rotor 16 and stator 20 with associated windings or electrical conductors is shown mounted externally of the washing-liquid container 2, it will be understood that the rotor 16 can be anchored directly onto the cylindrical end wall 6 of the washing drum and the stator 20 mounted on the inside of the end wall 24 of the container 2. In this latter case, the stator and rotor are both cast into a plastics material which insulates the conductors or windings from the electrically conductive washing liquid.

The construction of a highly suitable and inexpensive electric motor to be used in the washing machine will be described with reference to FIGS. 5, 6 and 7.

FIG. 5 illustrates in perspective a length of an originally flat strip of magnetisable material, preferably a material of the kind normally used to manufacture electric-motor cores. It is also possible, however, to use soft-iron plate. As will be seen from FIG. 5, the originally flat sheet-metal strip is bent or folded in an undulating fashion to provide tooth-like projections 25,26 which define grooves or openings 27, 28 and 29. Each groove 27,28,29 is arranged to accommodate an electrical conductor or bank part, while the tooth-like projections 25,26 form poles. The undulated strip, of which a part is shown in FIG. 5, is cut to a given length and then bent around a cylindrical mandril (not shown), whereafter the ends of the strip are bonded together as by welding or some other suitable method.

In the following it is assumed that the afore-described washing-machine motor according to FIGS. 1 to 3 is a variable speed, reversible motor. If the washing machine is to be capable of handling 6-8 kg dry load, one can take as a suitable starting point a 3-phase motor having a maximum torque of about 35 Nm at all speeds. This torque corresponds to about 3500 W power at 1000 rpm. If a motor of the least possible thickness is desired and a strip width A (FIG. 5) of 25 mm is chosen, i.e. the thickness of the motor will be only about 25 mm, the following principle motor-data with a plate gauge of 0.5 mm (conventional plate for electric motors) will be obtained.

Outer diameter of the stator $20 = \sim 332$ mm
Diameter of airgap $21 = \sim 300$ mm
Inner diameter of rotor $16 = \sim 274$ mm
Pole Number 50
Groove Number 1 (one groove for each pole and phase)

The width of the airgap 21 has been ignored here, but should be less than 0.6 mm.

The stator 20 is provided with 150 grooves having a width B (FIG. 6) of 3.7 mm and a depth C of 10 mm, and 150 tooth-like projections having a width E of 3.6 mm. The rotor 16 is provided with 165 grooves and tooth-like projections having a tooth-width E of 3 mm, a groove width B of 3.7 mm and a groove depth of 8 mm. So that the desired torque is obtained, the stator 20 is constructed in the manner shown in detail in FIG. 6. Pressed into a first undulated strip 31 of the kind illustrated in FIG. 5 is a second undulated strip 32, the outer dimensions of which are adapted to the inner dimensions of the tooth-like projections of strip 31 and to the outer dimensions of the grooves of strip 31. Pressed or fitted into the second strip 32 is a third undulated strip 33, and when seen practically the tooth-like projections of the stator 20 can be considered to be formed from a homogeneous material. When each tooth-like projection must be built up so as to be homogenous when seen practically, the number of undulated strips fitting one within the other will naturally vary in dependence upon the tooth width E and the gauge of the sheet metal used. The gaps shown between the strips 31,32 and 32,33, respectively in FIG. 6 denote layers of insulating varnish, paper or other insulating material, So as to obtain the greatest possible amount of iron in each tooth-like projection, each tooth-like projection of the nested strips 31, 32, 33 is given such a width as to obtain a tight abutment between the inner surface of an outer tooth-projection and the outer surface of an inner, subsequent tooth-like projection. The number of strips used is preferably such that the innermost tooth-like projection, which in FIG. 6 is formed by the strip 33, has an inner interspace or gap determined solely by the thickness of the insulation, as illustrated in FIG. 6. The stator conductors or hank conductors 34 and 35 shown in FIG. 6 are preferably placed in associated grooves prior to bending the strips 31, 32, 33 to cylindrical form of circular cross-section. The conductors, however, may also be placed in the respective grooves subsequent to bending said strips to said cylindrical form. When placing the conductors in the grooves prior to bending the strips, the advantage is afforded whereby the walls defining respective grooves move closer together as the strips are being bent, thereby to firmly clamp the conductors in said grooves. Subsequent to bending the strips around, for example, a cylindrical mandril a flat strip 36 is wound in the illustrated embodiment around the outside of the resultant cylinder in a manner to tightly abut the respective outer groove bottoms 37. The flat strip 36 also comprises a magnetisable material. In the illustrated ambodiment the strip 36 comprises eight turns. Thus, there is obtained a substantially homogenous outer ring having a height F of about 6 mm calculated from the bottom to the outside of the strip 36. The strip 36 suitably has the same width as the undulated strips 31, 32, 33. If the free, outer end of the strip 36 is not welded or bonded to the underlying strip turn, the whole of the stator 20 can, for example, be pressed into a cylindrical clamping ring, which in turn can replace the means 23 (FIG. 2).

In the illustrated embodiment the rotor 16 illustrated in FIG. 7 is constructed in a similar manner to the stator 20 shown in FIG. 6, using three undulated strips and an inner multi-turn planar strip. In the illustrated embodiment, this planar strip, which comprises a magnetisable material and has the same width as the undulated strips in the rotor 16 and stator 20, is only placed in seven turns and the distance between the groove bottoms and the inner diameter of the rotor is about 5 mm. A motor of the given dimensions obtains a current load of about 20,000 A/m at the requisite maximum torque of about 35 N/m at all speeds and a maximum flux density in the airgap, $B_{med}$, of about 0.6T.

The element illustrated in FIG. 7 comprises a short circuited rotor 16 having pressed into the grooves thereof in a known manner aluminium metal elements forming conductors, for example the conductors 38 and 39, the ends of which are conductively connected to each other by means of short-circuiting rings 40 pressed at the same time on respective rotor ends. When spokes 17 and hub 19 (FIG. 3) are required, these can be pressed at the same time as the conductors and short-circuiting rings.

A magnetisable core provided with one or more undulated sheet-metal strips of the described kind, optionally supplemented with a ring comprising a wound planar strip, can be used in any type of electric motor comprising a stator and/or rotor with pole-forming tooth-like projections, for example a d.c. motor or an asynchronous motor of single phase or multi-phase type.

To avoid cracking at the fold or bend edges of a strip, a soft and gentle transition region of relatively large radius, for example a radius of 1-2 mm, is arranged between two mutually connecting planar sides, for example the sides 42 and 43 in FIG. 6. In the aforegoing it has been assumed that the bent or folded strip surfaces pairwise form rightangles with each other, although, as will be understood, it is possible in certain cases to bend or fold the strip so that, prior to bending said strip to form a cylinder, the grooves have a frusto-conical cross-sectional shape, which changes to a rectangular shape when the strip is bent to said circular form.

Although the aforegoing description has been made with reference to a radial flux motor, in which the stator concentrically encircles the rotor, it will be understood that the invention can also be applied in the manufacture of a stator and/or rotor for an axial-flux machine, i.e. a machine in which the magnetic flux extends in the direction of the axis of rotation.

FIG. 8 is a simplified view of a stator for a washing-machine motor of this kind. In this embodiment, one or more undulating strips are bent circularly around the axis of rotation 44 of the motor, with the main plane of the strip at rightangles to said axis. A conductor hank 45 is arranged in two mutually adjacent grooves with an intermediate tooth-like projection 46, in an undulated strip 47. The sectional view in FIG. 9 illustrates three undulated strips 47, 48 and 49 arranged relative to one another in the same manner as that described with reference to FIG. 6. A planar strip 50 of magnetizable material is wound helically to form a ring and, as is evident from FIG. 9, the number of turns of the ring of the illustrated embodiment is such that said ring obtains the same width as the strips 47, 48, 49 of mutually equal width.

The ring formed by the strip 50 is connected to the undulated strips by means of fasteners (not shown), for example bolts which pass through the undulated, folded strips, the grooves and tooth-like projections of said strips lying in a plane at rightangles to the rotary axis 51 (FIG. 10).

FIG. 10 is a simplified view of an axial magnetic flux motor comprising a disc-like stator 52 according to FIG. 8 and a disc-like rotor 53 which in this embodiment is assumed to be connected to the shaft 41 of a washing drum.

To enable a single motor to be used, and then preferably a motor of the described kind in which at least the stator or the rotor comprises one or more undulated strips, there is provided in accordance with the invention a voltage supply means arranged to supply an alternating current voltage of variable amplitude and frequency to the motor. Since the amount of wash charged to the drum of the washing machine can vary, resulting in a varying load on the motor, it is important that a substantially constant torque can be maintained irrespective of the load. In the aforegoing, this torque has been assumed to be about 35 Nm at all drum speeds. It is also important to be able to utilize different drum speeds with one and the same motor. Thus, it can be suitable when washing a given type of material to use a first drum speed and with another type of material to use another drum speed, and in addition to use a considerably higher drum speed in the last stage of a washing cycle, this last stage comprising the spin-drying stage.

The aforedescribed, short-circuited asynchronous motor has been found particularly suitable for operating a washing machine while utilizing a static inverter, partly because it is particularly adapted to the operation of a washing machine, and partly because it is simple and inexpensive and is able to employ to the full those advantages afforded by supplying voltage through a transformer.

For the purpose of controlling the motor in dependence of load and at a desired speed, there is used an inverter 41 (FIG. 2) to be described in detail.

In FIG. 11 the reference 55 identifies the washing machine of FIG. 1. The washing machine 55 is provided with a short-circuited asynchronous motor, such as that illustrated in FIGS. 6 and 7, for example, and the motor is intended to be supplied with a three-phase a.c. voltage. In addition to the motor, the machine 55 also includes an inverter and other voltage-supply devices, and also a program mechanism 4 which determines rotation of the motor. The machine 55 has an input line 56 from the program mechanism 4, and said mechanism is arranged to transmit over the line 56 a signal to the inverter, which is a static type inverter, for determining the frequency of the current sent to the motor from the inverter 41. This signal, the frequency signal, determines rotation of the drum 3. The program mechanism 4 also sends start signals to the inverter over a line 57. The washing machine also includes a line 58 for selecting the direction of rotation of the drum 3 in response to control signals from the programme mechanism 4, which includes different, selected programmes for carrying out a washing sequence. A signal corresponding to the speed at which the motor rotates is transmitted from a line 59. When the speed of the motor of drum 3 is substantially equal to zero, the signal on line 59 in the exemplary embodiment is equal to a logic zero. In this case, the signal is supplied to the line 58 in order to change its logic state and to enable a start signal from the programme mechanism 4 to start the motor in a direction opposite to the nearest preceding direction.

The drive system illustrated in FIG. 12 has been chosen by way of example, and includes a three-phase rectifier 60 supplied from an a.c. mains 61. The rectifier 60 supplies a d.c. voltage of substantially constant amplitude via lines 62 and 63, the line 62 lying on positive potential and the line 63 on negative potential, and the voltage being supplied to a static inverter which includes six switching elements 64, 65, 66, 67, 68 and 69 which, in the illustrated embodiment, comprise transistors and which are arranged to successively connect the terminals 70, 71 and 72 of the motor 84 to the positive supply line 62 and the negative supply line 63 from the rectifier 60. As will be understood, thyristors or like elements can be used instead of transistors. A diode 141 is connected in antiparallel across each transistor for taking-up reactive currents when choking respective transistors. For the purpose of controlling the inverter, control signals are supplied from outputs 73, 74, 75, 76, 77 and 78 of a control means 79, which is shown in detail in FIG. 13. These control signals are supplied via an amplifier 80 to the base of respective transistors. The control means 79 is provided with signal inputs 81, 82 for sensing signals generated when sensing the d.c. current in line 62, and the signal input from lines 56, 57, 58 and an output to the line 59. The signal on line 59 is only used when wishing to change the direction of rotation of the motor while the washing machine is in operation. The direction of rotation of the motor is changed by sending a logic signal from the programme mechanism 4 to the line 58. The speed of the motor 84 is changed in dependence of the amplitude of a voltage signal on the input 56. The line 59 receives a start or stop signal from the programme mechanism 4 over a corresponding line 59, for starting or stopping the motor respectively.

The control means 79, which is illustrated in detail in FIG. 13 includes a sensing means 85 for sensing the amplitude of the d.c. current on line 62. The magnitude of this current is in direct proportion to the voltage between the signal inputs or signal lines 81 and 82. The output signal from the sensing means 85, which includes an amplifier 86, is fed to a first peak voltage detector 87, a low-pass filter 88, a second peak voltage detector 89 and a comparator 90. The detector 87 includes a diode 91 for allowing positive signals to pass through, and the detector 89 includes a diode 92 for allowing negative signals to pass through. Each detector also includes a low-pass filter. The first detector 87 preferably has a time constant of about 4/f, where f is the maximum fundamental frequency for the voltage supplied to the motor 84. The anti-resonance frequency, −3 dB, for the detector 87 preferably lies at 0.1f. The low-pass filter 88 preferably has the same anti-resonance frequency. The second detector 89 preferably has a time constant of about 1/f and an anti-resonance frequency of about 0.5f.

The output signal from the detector 87 is fed to a first control circuit 93, illustrated in detail in FIG. 14. The input signals from the line 56,57 is fed to a ramp generator 94, comprising two operational amplifiers coupled to form an integrating circuit for supplying an increasing ramp voltage to the control circuit 93 when the motor accelerates when started, and a decreasing ramp voltage while the motor slows down to a stop. This eliminates the risk of exceeding the loading current which prevails at normal speeds when the motor is started or stopped. A change in the frequency control signal is also integrated by the ramp generator 94, said control signal determining the frequency of the motor current and thus the speed of rotation of the motor, and appearing on the line 56. Consequently, a certain period of time lapses before the output signal from the ramp generator 94 is completely adapted to the input signals.

The signal from the first detector 87 (FIG. 14) is fed to one input of an operational amplifier 96 over a resistor 95. This signal is compared by the amplifier 96 with a reference signal, which is set by means of a variable resistor 97 and which is fed to said one input over a resistor 98. The other input of the amplifier 96 is earthed, and the amplifier is fed back by means of a resistor 99. Any deviation between the signal arriving from the detector 87 and the reference signal gives rise to an output signal from the amplifier 96, this output signal being supplied, via a resistor 100 and a diode 103, to one input of an operational amplifier 101, the other input of which is earthed. The output signal of the ramp generator 94 is also supplied to said one input of the amplifier 101, via a resistor 102. The amplifier 101 is fed back by means of two resistors 104 and 105 in series with the diode 103. The resistor 105 has a much lower resistance than the resistor 104, and the resistance relationship is preferably about 1:20. When the output signal of the first operational amplifier 96, measured on the diode 103, is more negative than the output signal from the second operational amplifier 101, measured on the diode 103, is positive, the voltage on the diode 103 is inversed. Amplification of the amplifier 101 in the closed loop will then become high, and the control circuit 93 will operate along the line 106 in FIG. 15, assuming a constant output signal from the ramp generator 94. If the output signal from the first detector 87 increases as a result of the direct current from the rectifier 60 increasing, the output signal from the amplifier 96 will be less negative and at a given signal level, designated 107 in FIG. 15 and pre-set by means of the resistor 97, the diode 103 will be biased in the conducting direction. This means that amplification of the amplifier 101 drastically decreases, so that the control circuit 93 transmits a frequency control signal according to the line 101 in FIG. 15. This signal becomes zero at about 120% of the signal on level 107. The frequency control signal from the output of the amplifier 101 is fed to a voltage-controlled oscillator 109, to the output 59 and to an analogue division circuit 110. This division circuit 110, which is, for example, of the commercially available kind Analog Devices AD 534, builds a signal which is $I_{average}/f$, where $I_{average}$ is the mean value of the magnetisable current to the motor prevailing at that moment and f is the frequency. This signal is an adequate indication of the axle torque of the motor. The voltage control oscillator 109 generates an output signal at a frequency which is proportional to the input voltage.

The rectified mean value signal, which is obtained from the low-pass filter 88, corresponds to the power input to the motor 85, since the voltage on the supply lines 62 and 63 is substantially constant. The signal is fed to the division circuit 110, where the signal is divided with the frequency control signal from the amplifier 101, which constitutes an order signal for determining the speed of rotation of the motor. Thus, the output signal from the division circuit 110 will correspond to the torque which the motor is required to produce. The output signal from the division circuit 110 is supplied to a second control circuit 110, and constitutes a first voltage control signal. The negative signal from the second peak value detector 89 forms a second voltage control signal, and is supplied to the second control circuit 111, whereby the output signal from the control circuit 111 becomes proportional with the difference between the first and the second voltage control signals. The negative signal from the detector 89 corresponds to the degree of magnetization of the motor 84 and is obtained from negative pulses, which are fed back to the d.c. voltage source when the transistors 64–69 are non-conducting. By controlling the amplitude of these negative pulses, it is possible to reach a given level of magnetization of the motor, and therewith to obtain a high ratio of power to weight and to avoid supersaturation, which causes losses. The aforedescribed motor construction thus affords important advantages.

If the signal from the detecting means 85 exceeds a given determined value, the output signal from the comparator 90 will have a low value, said comparator comparing the output signal with a reference signal obtained by means of an adjustable resistor 112. As a result hereof, the outputs 74, 76 and 78 from AND-gates 116, 117 and 118 will lie at a low level. This means that the transistors 65, 67 and 69 will change to a non-conducting state, so that the terminals 70, 71 and 72 are not connected to the negative terminal of the d.c. voltage source or line 63. This disconnection of the motor terminals protects the inverter from damage caused by transient currents.

The output signal from the voltage control oscillator 109 is fed to a timer 119, preferably an industrial timer of standard type 555, and a division circuit 120. The division circuit 120 preferably comprises a programmeable counter arranged to transmit a pulse train at a frequency which is equal to the frequency of the input signal divided by a selected constant. The timer 119 transmits a pulse train at a frequency equal to the frequency of the output signal from the oscillator 109. The pulse width is controlled by the output signal from the second control circuit 111. The pulse train from the timer 119 is fed to AND-gates 121, 122 and 123. The pulse train from the division circuit 120 forms a clock signal for a ring counter 124. A logic "1" and five logic "0" are stored in the ring counter 124. The logic "1" is shifted in the counter by the pulse train from the output 125 of the counter to the output 126, from there to the output 127 and further to the output 128, from the output 128 to the output 129 and further to the output 130, and from the output 130 back to the output 125. This shifting of the logic "1" stored in the counter 124 from the output 125 back to said output 125 corresponds to a period in the fundamental frequency of the voltage supplied to the motor 84. The output signals from the outputs 125–130 of the counter 124 are de-coded by OR-gates 131, 132 and 133. The output signal from respective gates lies for half the time at a high level and for half the time at a low level. A logic signal inverter 134 and NAND-gates 135, 136, 173, 138, 139 and 140 are arranged to control the direction of rotation of the motor 84. The output signals from the gates 131, 132 and 133 are fed to the AND-gates 116, 117, 118, 121, 122 and 123, for controlling the switching transistors 64–69 in the inverter. The inputs of the gates 116, 117 and 118 are coupled to logic signal inverters 142, 143 and 144. Because the pulse width of the pulses from the timer 119 are constantly independent of the frequency if the signal from the control circuit 111 is constant, the mean value over half the period of the fundamental frequency of the voltage will be changed simultaneously with the frequency. Further regulation of the mean voltage can be obtained by varying the pulse width, which is regulated by means of the control circuit 111.

The frequency signal from the programme mechanism 4, which signal is fed in over line 56 to the ramp generator 94, forms a set-point value which determines the frequency, and therewith the speed of the motor. At very low speeds, it may be necessary, or at least advantageous, to compare the set-point value with the actual or real speed of the motor, which can be effected in the manner illustrated in FIG. 16. FIG. 16 illustrates a frequency-signal-determining potentiometer 145 in the programme mechanism 4, said potentiometer transmitting set-point value signals to a control amplifier 146. The circuit 146 obtains a real value signal from a tachometer 147, which senses the speed of rotation of the washing drum or motor. The real-value signal is fed to the control amplifier 146, which generates a different signal, this signal being supplied to the ramp generator over line 94. When the washing load in the drum is lifted while the drum is rotated at a low speed, and the speed of rotation tends to decrease, the control amplifier 146 will transmit a speed-increase signal, and when the washing load tumbles down from the upper part of the drum the rotary speed will tend to increase as a result of the decreasing load on the motor, and the control amplifier will transmit a speed-decrease signal.

FIG. 4 illustrates a washing machine of the same kind as that illustrated in FIG. 1, i.e. a front-loaded machine, although in the FIG. 4 embodiment there is used a free-standing electrical brushless a.c. motor 22 arranged to drive the drum 3 over a drive belt 22' and a drive 22" mounted on the shaft of the washing drum, denoted 7 in FIG. 2, in a manner not shown in FIG. 4. According to the invention the motor 22 is supplied with energy from the inverter 41, as previously described.

As will be fully understood, the described embodiments of the novel washing-machine drive means are not limitive, but can be modified without departing from the scope of the invention. Neither is the invention limited to the use of the described inverter, but that other types of inverters permitting simple variation of the motor speed and magnetizing current can also be used.

I claim:

1. A washing machine comprising; a casing (1) which includes a washing-liquid container (2) and a washing drum (3) rotatably supported within the container (2) and intended to receive a washing load; a single electric bi-directional, brushless a.c. motor (84) including a rotor and a stator, means directly mechanically connecting said rotor to the rotatable washing drum, said a.c. motor being of multi-pole type and provided with terminals connected to a source of a.c. mains voltage via the out-put terminals of an inverter (41), and said inverter comprising means for generating an a.c. voltage at a variable frequency having a maximum value corresponding to the highest rotational speed of the washing drum selected and being in excess of the frequency of the mains voltage supplied to the inverter input.

2. A washing machine according to claim 1, wherein said a.c. motor (84) comprises a stator (20), which is provided with non-pole-changeable windings which are constantly active in operation, and wherein said inverter further comprises means (41) for supplying an a.c. voltage to the windings at a frequency, amplitude and phase sequence such that the motor alone ensures both washing in the two directions of rotation of the motor and spin-drying, and each at at least one selected speed.

3. A washing machine according to claim 2 wherein said inverter (84) comprises a static, preferably transistor-based converter having means (81, 82, 85) for sensing the load prevailing on the motor at each moment in time; and guide means (73) for the non-pole-changeable automatic adjustment of the output parameters, frequency and voltage of said converter in response to the load on the washing machine motor.

4. A washing machine according to claim 3, wherein the washing machine includes a program mechanism (4) arranged to send signals corresponding to the set-point value of drum speed and rotational direction of the guide means (73).

5. A washing machine according to claim 4, including means (143) arranged to produce a real value corresponding to drum speed, and means for sending said real value, together with said set-point value to a control circuit (142) for producing a frequency correction signal for correcting the frequency applied to the motor.

6. A washing machine according to claim 3, wherein sensing means (85) senses the d.c. current supplied to the inverter, said sensing means being connected to a first detector (87) arranged to generate a current signal corresponding to the magnitude of the sensed current, said detector being connected to a control circuit (93) for transmitting a frequency control signal to switching means (64–69) arranged to alternately connect said terminals (70–72) of the motor to a positive (62) and a negative (63) pole terminal of the d.c. voltage source of the converter; and wherein the control circuit comprises means such that frequency control signal is reduced when said current signal exceeds a given value.

7. A washing machine according to claim 1, characterized in that the washing drum (3) is provided with a trunnion (8) projecting from the washing-liquid container (2), the rotor (16) being fixedly mounted on said trunnion while the stator (20) is mounted on the liquid-washing container (2).

8. A washing machine according to claim 1 or claim 7, characterized in that the rotor (16) and/or the stator (20) has a magnetizable core provided with tooth-like projections (25,26) and intermediate grooves (27,28,29) for receiving electrical conductors (34), said core comprising a plurality of strips of magnetizable material undulated to form said tooth-like projections and grooves with the tooth-like projections of respective strips meshing with one another, said strips being bent to form a circular ring.

* * * * *